United States Patent
Outram

(10) Patent No.: US 10,461,528 B2
(45) Date of Patent: Oct. 29, 2019

(54) ELECTRICAL BYPASS APPARATUS

(71) Applicant: General Electric Technology GmbH, Baden (CH)

(72) Inventor: John Lewis Outram, Stone (GB)

(73) Assignee: General Electric Technology GmbH, Baden (CH)

( * ) Notice: Subject to any disclaimer, the term of this patent is extended or adjusted under 35 U.S.C. 154(b) by 213 days.

(21) Appl. No.: 15/326,105

(22) PCT Filed: Jul. 9, 2015

(86) PCT No.: PCT/EP2015/065737
§ 371 (c)(1),
(2) Date: Jan. 13, 2017

(87) PCT Pub. No.: WO2016/008804
PCT Pub. Date: Jan. 21, 2016

(65) Prior Publication Data
US 2017/0207621 A1    Jul. 20, 2017

(30) Foreign Application Priority Data
Jul. 14, 2014 (EP) .................................. 14275150

(51) Int. Cl.
*H02H 9/04* (2006.01)
*H02M 7/483* (2007.01)
(Continued)

(52) U.S. Cl.
CPC ............ *H02H 9/041* (2013.01); *H02H 7/122* (2013.01); *H02H 7/1225* (2013.01);
(Continued)

(58) Field of Classification Search
USPC .................................................. 361/35, 91.1
See application file for complete search history.

(56) References Cited

U.S. PATENT DOCUMENTS

2009/0021881 A1* 1/2009 Crevenat ................... H01T 2/02
  361/111
2009/0154044 A1* 6/2009 Crevenat ................... H01T 2/02
  361/91.1
(Continued)

FOREIGN PATENT DOCUMENTS

EP   1 796 068 A1   6/2007
EP   2 701 154 A1   2/2014
FR   2 742 599 A1   6/1997

OTHER PUBLICATIONS

Anonymous, "Over-voltage Protection Circuits," Electronic and Radio today, Nov. 27, 2013, Retrieved from the Internet URL: http://web.archive.org/web/20131127223925/http://www.electronics-radio.com/articles/analogue_circuits/power-supply-electronics/over-voltage-protection.php, on May 15, 2017, pp. 1-3.

(Continued)

*Primary Examiner* — Danny Nguyen
(74) *Attorney, Agent, or Firm* — Eversheds Sutherland (US) LLP

(57) ABSTRACT

An electrical bypass apparatus is provided, which comprises first and second terminals for connection across an electrical component; an electrically-triggered bypass switch being switchable to form a short circuit across the first and second terminals; and a first control circuit connected between the first and second terminals. The first control circuit includes mutually coupled first and second windings, the first winding being isolated from the second winding. The first control circuit is configured to inhibit a current flowing between the first and second terminals from flowing through the first winding when a normal operating voltage is present across the first and second terminals; and to permit a current to flow between the first and second terminals and through the first winding when an overvoltage is present across the first and second terminals and thereby induce a current pulse in the second winding.

19 Claims, 4 Drawing Sheets

(51) Int. Cl.
    *H02H 7/122* (2006.01)
    *H02M 3/335* (2006.01)
    *H02M 1/32* (2007.01)
(52) U.S. Cl.
    CPC ........ *H02H 9/043* (2013.01); *H02M 3/33569* (2013.01); *H02M 7/483* (2013.01); *H02M 2001/325* (2013.01); *H02M 2007/4835* (2013.01)

(56) References Cited

U.S. PATENT DOCUMENTS

2014/0002933 A1  1/2014  Gao et al.
2014/0293493 A1  10/2014  Heurtier et al.

OTHER PUBLICATIONS

Semikron, "Drivers Circuits," Power Guru—Power Electronics Information Portal, posted on Dec. 11, 2012, Retrieved from the Internet URL: http://www.powerguru.org/driver-circuits/, on May 5, 2017, pp. 1-5.

Extended European Search Report and Opinion issued in connection with corresponding EP Application No. 14275150.2, dated Jan. 27, 2015.

International Search Report and Written Opinion issued in connection with corresponding PCT Application No. PCT/EP2015/065737, dated Aug. 31, 2015.

International Preliminary Report on Patentability issued in connection with corresponding PCT Application No. PCT/EP2015/065737, dated Jan. 17, 2017.

* cited by examiner

ELECTRICAL BYPASS APPARATUS

BACKGROUND

Embodiments of the present invention relate to an electrical bypass apparatus.

An electrical apparatus may include one or more redundant electrical components so that the failure of one electrical component would not adversely affect the overall operation of the electrical apparatus. However, a series arrangement of the individual electrical components in the electrical apparatus means that the failure of an electrical component leads to the failure of the entire electrical apparatus because there is no path for a current to flow through the electrical apparatus. Under such circumstances a bypass switch is normally employed to provide a path that permits a current to bypass the failed electrical component, thus maintaining the operation and availability of the electrical apparatus.

BRIEF DESCRIPTION

According to an aspect of the invention, there is provided an electrical bypass apparatus comprising first and second terminals for connection across an electrical component; an electrically-triggered bypass switch being switchable to form a short circuit across the first and second terminals; and a first control circuit connected between the first and second terminals, the first control circuit including mutually coupled first and second windings, and the first winding being isolated from the second winding. The first control circuit is configured to inhibit a current flowing between the first and second terminals from flowing through the first winding when a normal operating voltage is present across the first and second terminals; and to permit a current to flow between the first and second terminals and through the first winding when an overvoltage is present across the first and second terminals and thereby induce a current pulse in the second winding. The second winding is electrically coupled to the electrically-triggered bypass switch such that the current pulse induced in the second winding acts as a switching control signal to close the electrically-triggered bypass switch and thereby form the short circuit across the first and second terminals.

The configuration of the electrical bypass apparatus as set out above permits the first control circuit to directly draw energy from the overvoltage present across the first and second terminals to facilitate closure of the electrically-triggered bypass switch and therefore formation of the short circuit across the first and second terminals. The formation of the short circuit across the first and second terminals then allows a current to flow between the first and second terminals and through the short circuit, thus bypassing the electrical component and thereby allowing the overvoltage to subside.

The provision of the first and second windings in the first control circuit permits the circuitry associated with the electrically-triggered bypass switch to be electrically referenced to a different potential from that of the first and second terminals. In turn, this permits the second winding to be connected in common with at least one further control circuit that is configured to selectively send a switching control signal to close the electrically-triggered bypass switch and thereby form the short circuit across the first and second terminals. A further control circuit may be, for example, a control card with a voltage sensor that is configured to detect an overvoltage across the electrical component and/or other faults.

Moreover the facility to connect the second winding of the first control circuit in common with at least one further control circuit facilitates a compact design of the electrical bypass apparatus, since it avoids the need to provide the electrical bypass apparatus with multiple means for electrically triggering the electrically-triggered bypass switch, such as multiple windings.

Furthermore the or each further control circuit may be configured differently from the first control circuit, and doing so would improve the reliability of triggering of the electrical bypass apparatus. This is because the first and further control circuits may be configured differently such that both of the first and further control circuits are unlikely to fail at the same time as a result of the same fault. In contrast, the use of identical control circuits to control the closure of the electrically-triggered bypass switch runs the risk of simultaneous failure of the two control circuits, since the identical control circuits are equally at risk of failure from the same fault.

The provision of the first control circuit in the electrical bypass apparatus therefore results in a simple, reliable and cost-efficient electrical bypass apparatus that is capable of forming a short circuit to allow current to bypass an electrical component experiencing an overvoltage.

When the electrical bypass apparatus includes a further control circuit that is configured to selectively send a switching control signal to close the electrically-triggered bypass switch and thereby form the short circuit across the first and second terminals, the electrical bypass apparatus may further include a first passive current check element arranged to permit current to flow in the second winding in only one direction.

The arrangement of the first passive current check element in this manner ensures that, when one of the first and further control circuits operates to close the electrically-triggered bypass switch, such operation to cause closure of the electrically-triggered bypass switch does not result in any electrical backfeed that could adversely affect and thereby potentially damage the other of the first and further control circuits. This allows the first and further control circuits to operate independently of each other in a reliable manner.

In embodiments of the invention the first control circuit may include a rectifier connected across the first and second terminals, the rectifier being configured to rectify a voltage present across the first and second terminals and thereby cause a current to flow between the first and second terminals and through the first winding.

An overvoltage across the first and second terminals may occur in either polarity depending on the direction of current originally flowing between the first and second terminals and through the electrical component. The provision of a rectifier in the first control circuit means that, when an overvoltage of either polarity is present across the first and second terminals, rectification of the overvoltage causes the polarity of the current induced in the second winding to be the same regardless of the polarity of the overvoltage. This thereby obviates the need for the electrically-triggered bypass switch to be capable of being closed by a switching control signal of either polarity, thus simplifying the design of the electrically-triggered bypass switch.

In further embodiments of the invention the first control circuit may further include a second passive current check element operatively connected to the rectifier and first winding such that the second passive current check element when in a blocking state blocks current from flowing from the rectifier to the first winding and such that the second passive current check element when in a conducting state permits current to flow from the rectifier to the first winding, wherein the second passive current check element is configured to switch from a blocking state to a conducting state when a voltage across the second passive current check element reaches a trip voltage threshold corresponding to the overvoltage.

The inclusion of the second passive current check element in the first control circuit ensures that a current pulse is induced in the second winding only when the trip voltage threshold is reached as a result of the overvoltage appearing across the first and second terminals, thus ensuring that the short circuit is not formed across the first and second terminals when there is no overvoltage across the first and second terminals. This thereby enhances the reliability of the electrical bypass apparatus.

In such embodiments of the invention the first control circuit may further include a first energy storage device connected in parallel with the second passive current check element, wherein the first energy storage device is capable of selectively storing and releasing energy. The provision of the first energy storage device in the first control circuit prevents spurious induction of the current pulse in the second winding that would have otherwise resulted from the rate of change of voltage and any short, transient overvoltages that appear across the first and second terminals during normal operation of the electrical component.

In further such embodiments of the invention the first control circuit may further include a first resistive element connected in parallel with the first energy storage device. The provision of the first resistive element in the first control circuit not only enables the first energy storage device to be reliably discharged when the first control circuit is not required to be operational, but also prevents the first energy storage device from being charged by transient overvoltages that could cause a current pulse to be induced in the second winding and thereby lead to unwanted closure of the electrically-triggered bypass switch.

Optionally the first control circuit may further include a second energy storage device connected in parallel with the first winding, wherein the second energy storage device is capable of selectively storing and releasing energy. The provision of the second energy storage device in the first control circuit ensures that a current pulse is not induced in the second winding as a result of any flow of current in the first control circuit that resulted from the rate of change of voltage and any short, transient overvoltages that appear across the first and second terminals during normal operation of the electrical component.

The first control circuit may further include a second resistive element connected in parallel with the first winding and/or a third resistive element connected in series with the first winding.

Similarly to the first energy storage device, each of the second and third resistive elements prevents spurious induction of the current pulse in the second winding that would have otherwise resulted from the rate of change of voltage that appears across the first and second terminals during normal operation of the electrical component.

The second and third resistive elements may be configured to define a voltage divider to control the voltage across the first winding when current flows through the first winding. The provision of the voltage divider in the first control circuit permits adjustment of the resistances of the second and third resistive elements to reduce the voltage applied across the first winding when current flows through the first winding, thus not only preventing the other components of the electrical bypass apparatus from being exposed to an overvoltage but also permitting a reduction in the size and cost of the first winding.

In embodiments of the invention employing the use of the second passive current check element, the electrical bypass apparatus may further include a voltage source configured to selectively supply a voltage to insert a voltage drop in series with the second passive current check element in order to further configure the second passive current check element to switch from a blocking state to a conducting state when the sum of a voltage across the second passive current check element and the inserted voltage drop reaches a trip voltage threshold corresponding to the overvoltage.

The provision of such a voltage source in the electrical bypass apparatus permits the variation of the overvoltage level at which the current pulse is induced in the second winding and thereby permits the configuration of the electrical bypass apparatus to address different types of faults that result in different overvoltage levels across the first and second terminals.

In such embodiments, the first control circuit may further include a third energy storage device connected in series with the second passive current check element, and the voltage source may be configured to selectively supply the voltage to charge the third energy storage device to insert the voltage drop in series with the second passive current check element in order to further configure the second passive current check element to switch from a blocking state to a conducting state when the sum of a voltage across the second passive current check element and the voltage drop reaches a trip voltage threshold corresponding to the overvoltage.

The provision of the third energy storage device in the first control circuit permits the reliable insertion of a desired voltage drop in series with the second passive current check element.

In embodiments employing the use of the third energy storage device, the first control circuit may further include a third passive current check element connected in parallel with the third energy storage device, the third passive current check element being arranged such that the third passive current check element when in a blocking state blocks current from flowing from the rectifier to the first winding and such that the third passive current check element when in a conducting state permits current to flow from the rectifier to the first winding. The third passive current check element may be configured to switch from a blocking state to a conducting state at a voltage level which is greater than the voltage drop inserted in series with the second passive current check element and/or is lower than the voltage level at which the second passive current check element switches from a blocking state to a conducting state.

In further embodiments employing the use of the third energy storage device, the first control circuit may further include a fourth resistive element connected in parallel with the third energy storage device. The provision of the fourth resistive element in the first control circuit not only enables the third energy storage device to be reliably discharged when the first control circuit is not required to be operational, but also prevents the third energy storage device from being charged by transient overvoltages that could lead to an unwanted change of the level the sum of the inserted voltage drop and the voltage across the second passive current check element must reach before the second passive current check element can switch from a blocking state to a conducting state.

In an embodiment, the resistance of the first resistive element is greater than the resistance of the fourth resistive element and/or the energy storage capacity of the third energy storage device is greater than the energy storage capacity of the first energy storage device. Configuration of the first control circuit in this manner enhances the capability of the electrical bypass apparatus to carry out its function reliably and accurately.

In still further embodiments of the invention, the voltage source may include a pulse transformer configured to selectively supply the voltage to insert the voltage drop in series with the second passive current check element.

The provision of the pulse transformer in the voltage source permits the circuitry associated with the electrically-triggered bypass switch to be electrically referenced to a different potential from that of the first and second terminals.

In an embodiment, the voltage source further includes an additional rectifier configured to rectify the voltage supplied by the pulse transformer. This permits the use of an AC voltage supply in order to insert a DC voltage drop in series with the second passive current check element.

It will be appreciated that the pulse transformer may be combined with other electrical devices in order to convert the supplied voltage into a DC voltage drop for insertion in series with the second passive current check element.

BRIEF DESCRIPTION OF THE DRAWINGS

Embodiments of the invention will now be described, by way of non-limiting examples, with reference to the accompanying drawings in which.

DETAILED DESCRIPTION

Figure 1:
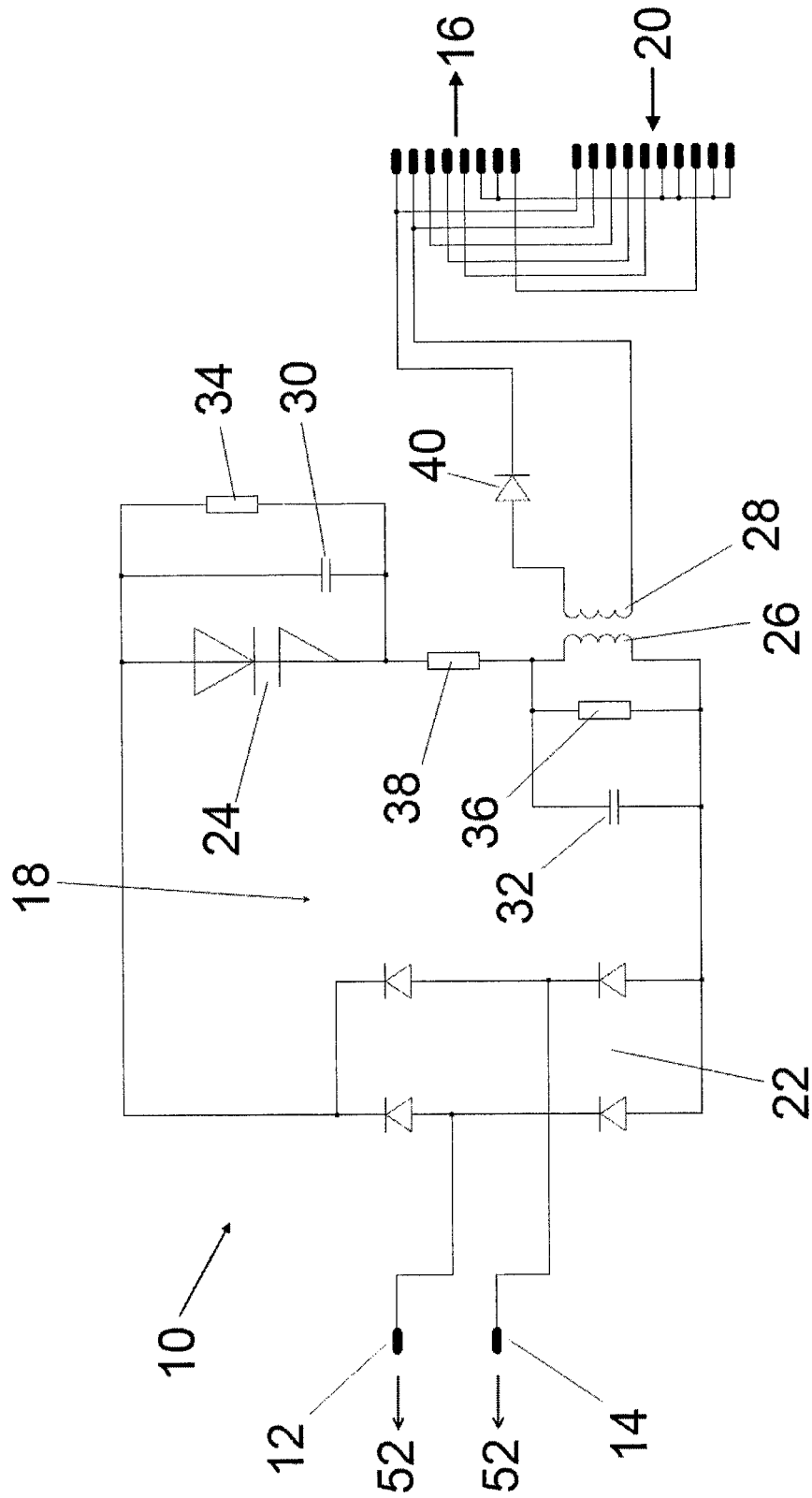
FIG. 1 shows, in schematic form, an electrical bypass apparatus according to a first embodiment of the invention.

An electrical bypass apparatus according to a first embodiment of the invention is shown in FIG. 1, and is designated generally by the reference numeral 10.

The electrical bypass apparatus 10 comprises first and second terminals 12,14, an electrically-triggered bypass switch 16, and first and further control circuits 18,20.

In use, the electrically-triggered bypass switch 16 is switchable to form a short circuit across the first and second terminals 12,14.

The first control circuit 18 is connected between the first and second terminals 12,14. The first control circuit 18 includes a rectifier 22 that is connected in parallel with a series connection of a breakover diode 24 and a first winding 26.

The rectifier 22 includes two pairs of series-connected diodes that are connected in parallel in a bridge configuration. A first junction between one of the pairs of series-connected diodes is connected to the first terminal 12, and a second junction between the other of the pairs of series-connected diodes is connected to the second terminal 14. In this manner the rectifier 22 is capable of rectifying a voltage that appears across the first and second terminals 12,14. It will be appreciated that the configuration of the rectifier 22 may vary so long as it is capable of rectifying a voltage that appears across the first and second terminal 14.

The breakover diode 24 is arranged in the first control circuit 18 such that the breakover diode 24 when in a blocking state blocks current from flowing from the rectifier 22, through the breakover diode 24 and to the first winding 26, and that the breakover diode 24 when in a conducting state permits current to flow from the rectifier 22, through the breakover diode 24 and to the first winding 26. The breakover diode 24 is configured to switch from a blocking state to a conducting state when a voltage across the breakover diode 24 reaches a trip voltage threshold. A trip voltage threshold is set to correspond to an overvoltage (i.e. a voltage that exceeds a normal operating voltage) appearing across the first and second terminals 12,14.

It will be appreciated that the breakover diode 24 may be replaced by any passive current check element that when in a blocking state blocks current from flowing from the rectifier 22 to the first winding 26 and that when in a conducting state permits current to flow from the rectifier 22 to the first winding 26.

The first control circuit 18 further includes a second winding 28 that is mutually coupled with the first winding 26 and isolated from the first winding 26. As such the flow of current through the first winding 26 induces a current pulse in the second winding 28.

In use, the second winding 28 is electrically coupled to the electrically-triggered bypass switch 16 such that the current pulse induced in the second winding 28 acts as a switching control signal to close the electrically-triggered bypass switch 16 and thereby form the short circuit across the first and second terminals 12,14.

The first control circuit 18 further includes first and second capacitors 30,32, and first, second and third resistors 34,36,38. The first capacitor 30 is connected in parallel with the breakover diode 24. The second capacitor 32 is connected in parallel with the first winding 26. The first resistor 34 is connected in parallel with the first capacitor 30. The second resistor 36 is connected in parallel with the second capacitor 32. The third resistor 38 is connected in series between the breakover diode 24 and the first winding 26.

The provision of the first resistor 34 in the first control circuit 18 enables the first capacitor 30 to be reliably discharged when the first control circuit 18 is not required to be operational.

The arrangement of the second and third resistors 36,38 as set out above enables the second and third resistors 36,38 to define a voltage divider to control the voltage across the first winding 26 when current flows through the first winding 26. The provision of the voltage divider in the first control circuit 18 permits adjustment of the resistances of the second and third resistors 36,38 to reduce the voltage applied across the first winding 26 when current flows through the first winding 26, thus permitting a reduction in the size and cost of the first winding 26.

It will be appreciated that each capacitor 30,32 may be replaced by any energy storage device that is capable of storing and releasing energy.

The further control circuit 20 is configured to selectively send a switching control signal to close the electrically-triggered bypass switch 16 and thereby form the short circuit across the first and second terminals 12,14. More particularly, the further control circuit 20 is a control card with a voltage sensor that is configured to detect an overvoltage across the capacitor 56.

The electrical bypass apparatus 10 further includes a diode 40 arranged to permit current to flow in the second winding 28 in only one direction.

Figure 2:
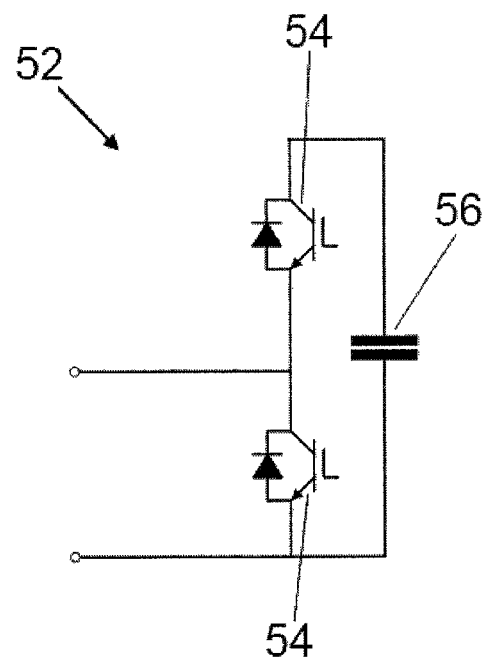
FIGS. 2 and 3 respectively show, in schematic form, a half-bridge module and a full-bridge module.

Operation of the electrical bypass apparatus 10 is described as follows, with reference to FIGS. 1 and 2.

In use, the electrical bypass apparatus 10 is connected to an electrical component, namely a half-bridge module 52. More specifically, the first terminal 12 of the electrical bypass apparatus 10 is connected to a first module terminal of a half-bridge module 52, the structure of which is shown in FIG. 2, and the second terminal 14 of the electrical bypass apparatus 10 is connected to a second module terminal of the same half-bridge module 52. In this manner a current may flow between the first and second terminals 12,14 and through the half-bridge module 52.

The half-bridge module 52 is one of a plurality of series-connected modules that forms part of a converter (not shown). The half-bridge module 52 includes a pair of IGBTs 54 (each of which is connected in anti-parallel with a diode) and a module capacitor 56. The pair of IGBTs 54 are connected in parallel with the module capacitor 56 in a half-bridge arrangement. As such the half-bridge module 52 is capable of providing a near-zero or positive voltage and conducting current in two directions.

During normal operation of the converter, the IGBTs 54 of the half-bridge module 52 are selectively turned on and off so as to insert the module capacitor 56 into the converter or bypass the module capacitor 56. In this manner the half-bridge module 52 is operated to selectively provide a voltage source to the converter. Meanwhile the half-bridge module 52 presents a normal operating voltage (i.e. a near-zero or positive voltage) across the first and second terminals 12,14 of the electrical bypass apparatus 10.

Since the normal operating voltage across the first and second terminals 12,14 of the electrical bypass apparatus 10 is below the trip voltage threshold of the breakover diode 24, the breakover diode 24 inhibits a current flowing between the first and second terminals 12,14 from flowing through the breakover diode 24 to the first winding 26. This ensures that the short circuit is not formed across the first and second terminals 12,14 when there is no overvoltage across the first and second terminals 12,14.

The provision of the first resistor 34 in the first control circuit 18 prevents the first capacitor 30 from being charged by transient overvoltages up to the breakover diode threshold. Otherwise such transient overvoltages could undesirably cause a current pulse to be induced in the second winding 28 and thereby lead to unwanted closure of the electrically-triggered bypass switch 16.

The provision of the first capacitor 30 and the second and third resistors 36,38 in the first control circuit 18 prevents spurious induction of the current pulse in the second winding 28 that would have otherwise resulted from breakover of the breakover diode due to the rate of change of voltage that appears across the first and second terminals 12,14 during normal operation of the half-bridge module 52. The provision of the first capacitor 30 in the first control circuit 18 also prevents spurious induction of the current pulse in the second winding 28 that would have otherwise resulted from breakover of the breakover diode due to any short, transient overvoltages that appear across the first and second terminals 12,14 during normal operation of the half-bridge module 52.

The provision of the second capacitor 32 in the first control circuit 18 ensures that a current pulse is not induced in the second winding 28 as a result of any flow of current in the first control circuit 18 that results from the rate of change of voltage and any short, transient overvoltages that appear across the first and second terminals 12, 14 during normal operation of the half-bridge module 52.

Failure of the half-bridge module 52 may arise as a result of, for example, damage to its components. If the half-bridge module 52 fails in a way that renders it incapable of carrying a current, the remainder of the plurality of series-connected modules would be prevented from carrying a current, and so the overall operation and availability of the converter would be adversely affected.

In the event of failure of the half-bridge module 52 fails in a way that renders it incapable of carrying a current, an overvoltage could appear across the first and second module terminals of the half-bridge module 52 and therefore appear across the first and second terminals 12, 14 of the first control circuit 18.

When an overvoltage is present across the first and second terminals 12, 14, the rectifier 22 carries out rectification of the overvoltage. This in turn causes a voltage across the breakover diode 24 to reach its trip voltage threshold, and so the breakover diode 24 switches from its blocking state to its conducting state, thus permitting current to flow from the rectifier 22, through the breakover diode 24 and to the first winding 26.

The provision of the rectifier 22 in the first control circuit 18 means that, when an overvoltage of either polarity is present across the first and second terminals 12, 14, rectification of the overvoltage causes the polarity of the current induced in the second winding 28 to be the same regardless of the polarity of the overvoltage.

As a result of the mutual coupling between the first and second windings 28, the flow of current through the first winding 26 induces a current pulse in the second winding 28. As mentioned above, the current pulse induced in the second winding 28 acts as a switching control signal to close the electrically-triggered bypass switch 16 and thereby form the short circuit across the first and second terminals 12,14.

In this manner the first control circuit 18 directly draws energy from the overvoltage present across the first and second terminals 12, 14 to facilitate closure of the electrically-triggered bypass switch 16 and therefore formation of the short circuit across the first and second terminals 12, 14. The formation of the short circuit across the first and second terminals 12, 14 then allows a current to flow between the first and second terminals 12, 14 and through the short circuit, thus bypassing the half-bridge module 52 and thereby allowing the overvoltage to subside. This in turn means that the remainder of the series-connected modules are not prevented by the half-bridge module 52 from carrying a current and so the converter is permitted to continue its operation.

As mentioned above, the further control circuit 20 is configured to selectively send a switching control signal to close the electrically-triggered bypass switch 16 and thereby form the short circuit across the first and second terminals 12,14. As such the further control circuit 20 introduces redundancy into the electrical bypass apparatus 10 in that either of the first and further control circuits 18,20 can be used to close the electrically-triggered bypass switch 16 to form the short circuit in the event of failure of the other of the first and further control circuits 18,20.

Moreover the facility to connect the second winding of the first control circuit 18 in common with the further control circuit 20 facilities a compact design of the electrical bypass apparatus 10, since there would be no need for the further control circuit 20 to be configured to send the switching control signal to the electrically-triggered bypass switch 16 via a different means. The arrangement of the diode 40 to permit current to flow in the second winding 28 in only one direction ensures that, when one of the first and further control circuits 18,20 operates to close the electrically-triggered bypass switch 16, such operation to cause closure of the electrically-triggered bypass switch 16 does not result in any electrical backfeed that could adversely affect and thereby potentially damage the other of the first and further control circuits 18,20.

Furthermore, since the further control circuit 20 is configured differently from the first control circuit 18, both of the first and further control circuits 18,20 are unlikely to fail at the same time as a result of the same fault, e.g. a damaged voltage sensor or a poorly installed control card.

Figure 3:
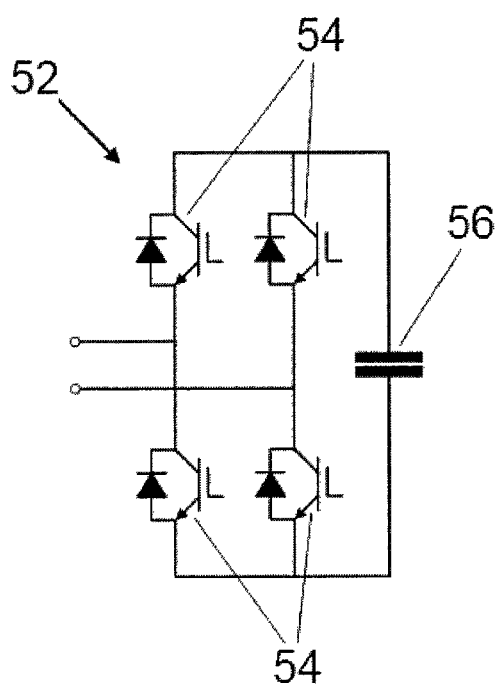

It will be appreciated that the half-bridge module 52 described above with reference to the embodiment shown in FIG. 1 is merely chosen to help illustrate the working of an embodiment of the invention, and the electrical bypass apparatus 10 according to an embodiment of the invention may be used in combination with other type of electrical components, e.g. a full-bridge module 52 as shown in FIG. 3.

Figure 4:
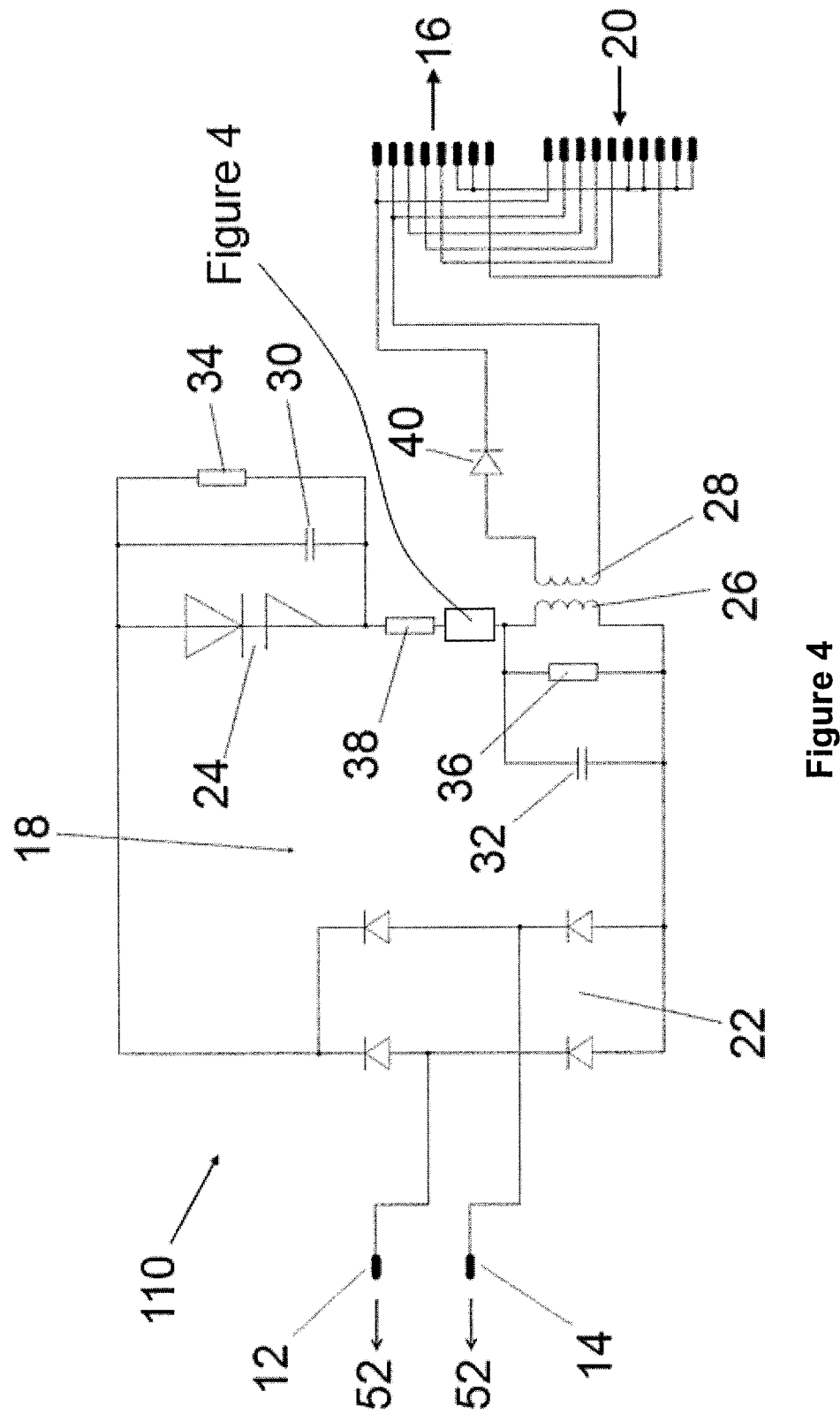
FIGS. 4 and 5 shows, in schematic form, an electrical bypass apparatus according to a second embodiment of the invention.

An electrical bypass apparatus according to a second embodiment of the invention is shown in FIG. 4, and is designated generally by the reference numeral 110. The electrical bypass apparatus 110 of FIG. 4 is similar in structure and operation to the electrical bypass apparatus 10 of FIG. 1, and like features share the same reference numerals.

Figure 5:
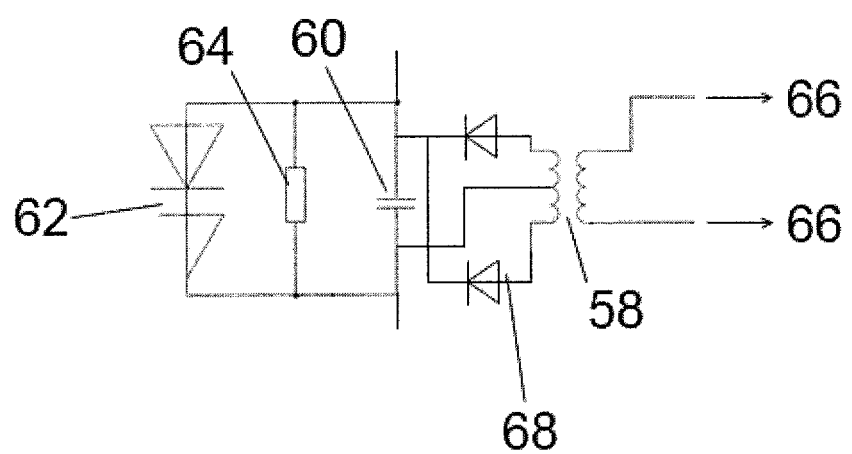

The electrical bypass apparatus 110 of FIG. 4 differs from the electrical bypass apparatus 10 of FIG. 1 in that, as shown in FIG. 5, the first control circuit 18 of the electrical bypass apparatus 110 of FIG. 4 additionally includes a voltage source that includes a pulse transformer 58; a third capacitor 60 connected in series with the breakover diode 24, where the capacitance of the third capacitor 60 is greater than the capacitance of the first capacitor 30; an additional breakover diode 62 connected in parallel with the third capacitor 60, where the voltage level at which the additional breakover diode 62 switches from a blocking state to a conducting state is lower than the voltage level at which the breakover diode 24 switches from a blocking state to a conducting state; and a fourth resistor 64 connected in parallel with the third capacitor 60, where the resistance of the first resistor 34 is greater than the resistance of the fourth resistor.

The input winding of the pulse transformer 58 is electrically connected to an AC voltage supply 66 (such as a low-voltage, high-frequency AC voltage supply). The further control circuit 20 is configured to selectively control the AC voltage supply 66 to provide a voltage to the input of the pulse transformer 58.

The output winding of the pulse transformer 58 is connected to the third capacitor 60 via a diode rectifier 68. This allows the third capacitor 60 to be charged to a DC voltage when the AC voltage supply 66 is controlled to provide a voltage to the input of the pulse transformer 58. The third capacitor 60 acts to smooth the voltage supplied by the pulse transformer 58 via the diode rectifier 68.

The additional breakover diode 62 is arranged in the first control circuit 18 such that the additional breakover diode 62 when in a blocking state blocks current from flowing from the rectifier 22, through the breakover diode 24, through the additional breakover diode 62 and to the first winding 26, and that the additional breakover diode 62 when in a conducting state permits current to flow from the rectifier 22, through the breakover diode 24, through the additional breakover diode 62 and to the first winding 26.

When the AC voltage supply 66 is not controlled to provide a voltage to the input of the pulse transformer 58, the overvoltage level at which the current pulse is induced in the second winding 28 is determined by the voltage level at which the breakover diode 24 switches from a blocking state to a conducting state, as discussed above with reference to the first embodiment of the invention. Since the voltage level at which the additional breakover diode 62 switches from a blocking state to a conducting state is lower than the voltage level at which the breakover diode 24 switches from a blocking state to a conducting state, the switching of the breakover diode 24 from its blocking state to its conducting state results in the switching of the additional breakover diode 62 from its blocking state to its conducting state to permit current to flow from the rectifier 22, through the breakover diode 24, through the additional breakover diode 62 and to the first winding 26.

When the AC voltage supply 66 is controlled to provide a voltage to the input of the pulse transformer 58, the resultant charging of the third capacitor 60 results in the insertion of a DC voltage drop in series with the breakover diode 24. This results in the further configuration of the breakover diode 24 to switch from a blocking state to a conducting state when the sum of a voltage across the breakover diode 24 and the inserted DC voltage drop reaches a trip voltage threshold corresponding to a higher overvoltage level. This in turn results in the switching of the additional breakover diode 62 from its blocking state to its conducting state to permit current to flow from the rectifier 22, through the breakover diode 24, through the additional breakover diode 62 and to the first winding 26. Thus, the overvoltage level at which the current pulse is induced in the second winding 28 is determined by the sum of the inserted DC voltage drop and the voltage level at which the breakover diode 24 switches from a blocking state to a conducting state.

In this manner the electrical bypass apparatus 110 of FIG. 4 is configured to permit selective supply of a voltage to insert a voltage drop in series with the breakover diode 24 in order to further configure the breakover diode 24 to switch from a blocking state to a conducting state when the sum of a voltage across the breakover diode 24 and the inserted voltage drop reaches a trip voltage threshold corresponding to the overvoltage.

The ability to vary the overvoltage level at which the current pulse is induced in the second winding 28 permits the configuration of the electrical bypass apparatus 110 to address different types of faults that result in different overvoltage levels across the first and second terminals 12,14.

The provision of the fourth resistor 64 in the first control circuit 18 not only enables the third capacitor 60 to be reliably discharged when the first control circuit 18 is not required to be operational, but also prevents the third capacitor 60 from being charged by transient overvoltages that could lead to an unwanted increase of the level the total voltage across the series circuit of the breakover diode 24 and third capacitor 60 must reach before the breakover diode 24 can switch from a blocking state to a conducting state.

The additional breakover diode 62 is configured to switch from a blocking state to a conducting state at a voltage level which is greater than the inserted DC voltage drop.

It is envisaged that, in other embodiments of the invention, the additional breakover diode 62 may be omitted from the electrical bypass apparatus 110 of FIG. 4 if the capacitance of the third capacitor 60 is large enough to permit the transmission of sufficient energy to induce the required current pulse in the second winding 28 to trigger the closing of the electrically-triggered bypass switch 16.

It is also envisaged that, in still other embodiments of the invention, the output winding of the pulse transformer 58 may be a two-wire output winding, and the output winding may be connected to the third capacitor 60 via a full-bridge rectifier.

It is to be understood that even though numerous characteristics and advantages of various embodiments have been set forth in the foregoing description, together with details of the structure and functions of various embodiments, this disclosure is illustrative only, and changes may be made in detail, especially in matters of structure and arrangement of parts within the principles of the embodiments to the full extent indicated by the broad general meaning of the terms in which the appended claims are expressed. It will be appreciated by those skilled in the art that the teachings disclosed herein can be applied to other systems without departing from the scope and spirit of the application.

The invention claimed is:

1. An electrical bypass apparatus comprising:
   first and second terminals for connection across an electrical component;
   an electrically-triggered bypass switch being switchable to form a short circuit across the first and second terminals; and
   a first control circuit connected between the first and second terminals, the first control circuit including mutually coupled first and second windings, the first winding being isolated from the second winding, the first control circuit being configured to:
   inhibit a current flowing between the first and second terminals from flowing through the first winding when a normal operating voltage is present across the first and second terminals; and
   permit a current to flow between the first and second terminals and through the first winding when an overvoltage is present across the first and second terminals and thereby induce a current pulse in the second winding,
   wherein the second winding is electrically coupled to the electrically-triggered bypass switch such that the current pulse induced in the second winding acts as a switching control signal to close the electrically-triggered bypass switch and thereby form the short circuit across the first and second terminals; and
   wherein the first control circuit includes a rectifier connected across the first and second terminals, the rectifier being configured to rectify a voltage present across the first and second terminals and thereby cause a current to flow between the first and second terminals and through the first winding.

2. An electrical bypass apparatus according to claim 1, further comprising a second control circuit configured to selectively send a switching control signal to close the electrically-triggered bypass switch and thereby form the short circuit across the first and second terminals.

3. An electrical bypass apparatus according to claim 2, further comprising a first passive current check element arranged to permit current to flow in the second winding in only one direction.

4. An electrical bypass apparatus according to claim 1 wherein the first control circuit further includes a second passive current check element operatively connected to the rectifier and first winding such that the second passive current check element when in a blocking state blocks current from flowing from the rectifier to the first winding and such that the second passive current check element when in a conducting state permits current to flow from the rectifier to the first winding, wherein the second passive current, check element is configured to switch from a blocking state to a conducting state when a voltage across the second passive current check element, reaches a trip voltage threshold corresponding to the overvoltage.

5. An electrical bypass apparatus according to claim 4, wherein the first control circuit further includes a first energy storage device connected in parallel with the second passive current check element, wherein the first energy storage device is capable of selectively storing and releasing energy.

6. An electrical bypass apparatus according to claim 5, wherein the first control circuit further includes a first resistive element connected in parallel with the first energy storage device.

7. An electrical bypass apparatus according to claim 1, wherein the first control circuit further includes a second energy storage device connected in parallel with the first winding, wherein the second energy storage device is capable of selectively storing and releasing energy.

8. An electrical bypass apparatus according to claim 1, wherein the first control circuit further includes a second resistive element connected in parallel with the first winding.

9. An electrical bypass apparatus according to claim 1, wherein the first control circuit further includes a third resistive element connected in series with the first winding.

10. An electrical bypass apparatus according to claim 8, wherein the second and third resistive elements are configured to define a voltage divider to control the voltage across the first winding when current flows through the first winding.

11. An electrical bypass apparatus according to claim 5, wherein the electrical bypass apparatus further includes a voltage source configured to selectively supply a voltage to insert a voltage drop in series with the second passive current check element in order to further configure the second passive current check element to switch from a blocking state to a conducting state when the sum of a voltage across the second passive current check element and the inserted voltage drop reaches a trip voltage threshold corresponding to the overvoltage.

12. An electrical bypass apparatus according to claim 11, wherein the first control circuit further includes a third energy storage device connected in series with the second passive current check element, and the voltage source is configured to selectively supply the voltage to charge the third energy storage device to insert the voltage drop in series with the second passive current check element in order to further configure the second passive current check element to switch from a blocking state to a conducting state when the sum of a voltage across the second passive current check element and the inserted voltage drop reaches a trip voltage threshold corresponding to the overvoltage.

13. An electrical bypass apparatus according to claim 12, wherein the first control circuit further includes a third passive current check element connected in parallel with the third energy storage device, the third passive current check element being arranged such that the third passive current check element when in a blocking state blocks current from flowing from the rectifier to the first winding and such that the third passive current check element when in a conducting state permits current to flow from the rectifier to the first winding.

14. An electrical bypass apparatus according to claim 13, wherein the third passive current check element is configured to switch from a blocking state to a conducting state at a voltage level which is greater than the voltage drop inserted in series with the second passive current check element and/or is lower than the voltage level at which the second passive current check element switches from a blocking state to a conducting state.

15. An electrical bypass apparatus according to claim 12, wherein the first control circuit further includes a fourth resistive element connected in parallel with the third energy storage device.

16. An electrical bypass apparatus according to claim 6, wherein the first control circuit further includes a fourth resistive element connected in parallel with the third energy storage device, and the resistance of the first resistive element is greater than the resistance of the fourth resistive element.

17. An electrical bypass apparatus according to claim 12, wherein the energy storage capacity of the third energy storage device is greater than the energy storage capacity of the first energy storage device.

18. An electrical bypass apparatus according to claim 11, wherein the voltage source includes a pulse transformer configured to selectively supply the voltage to insert the voltage drop in series with the second passive current check element.

19. An electrical bypass apparatus according to claim 18, wherein the voltage source further includes an additional rectifier configured to rectify the voltage supplied by the pulse transformer.

* * * * *